United States Patent Office 3,014,385
Patented Dec. 26, 1961

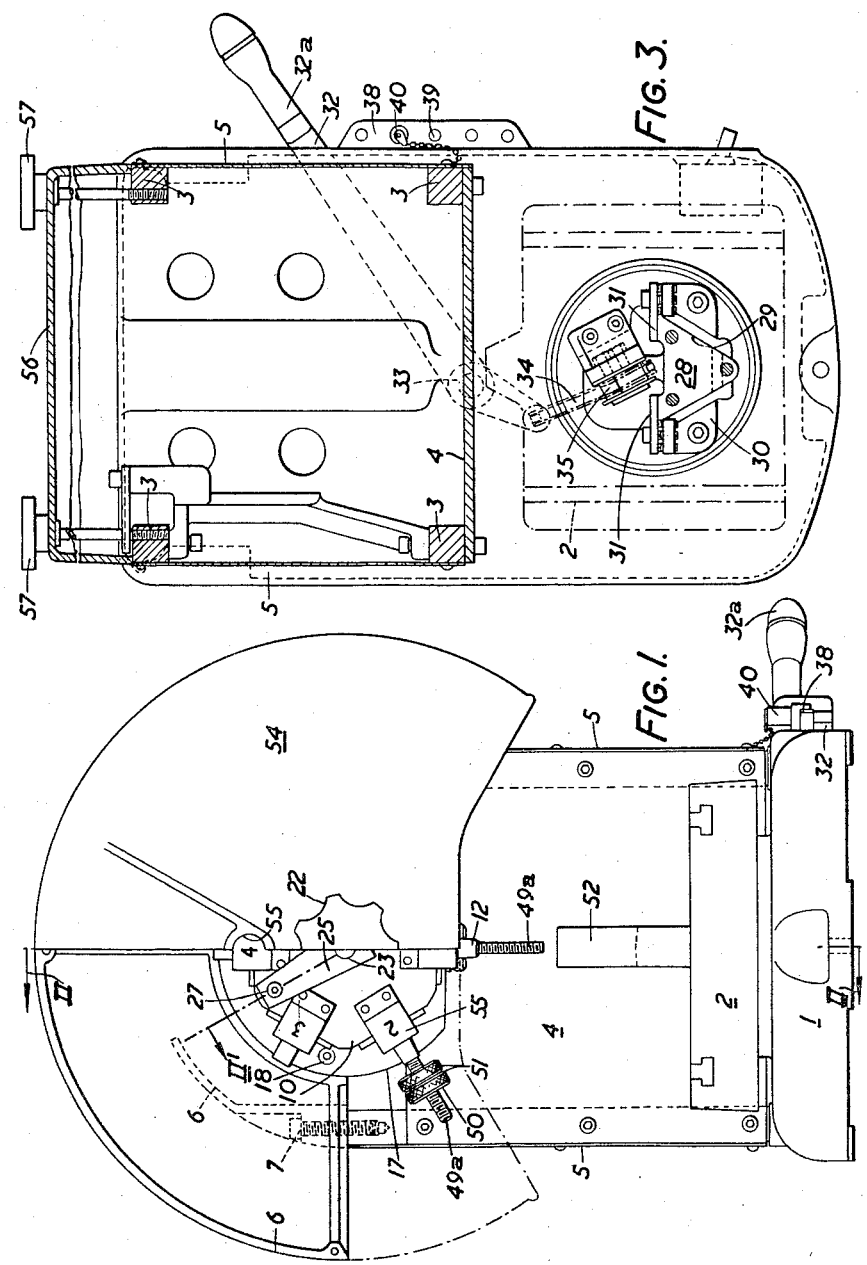

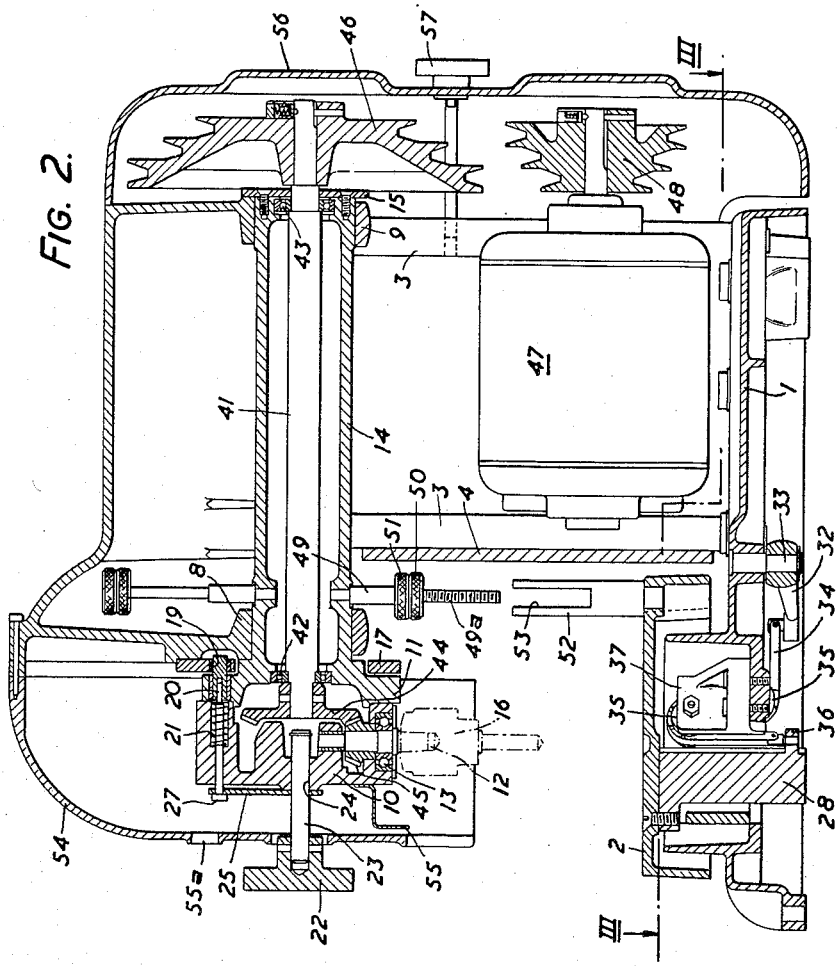

3,014,385
MACHINE TOOLS
John Shaw, Downend, Bristol, England, assignor to The Tungum Company Limited, Arle, Cheltenham, England
Filed Apr. 10, 1959, Ser. No. 805,471
Claims priority, application Great Britain Apr. 14, 1958
12 Claims. (Cl. 77—25)

This invention relates to machine tools and is particularly concerned with multi-purpose drilling machines.

The term "drilling" as used herein is intended to include such operations as drilling, reaming, tapping, spot-facing, counter-boring and counter-sinking in which the relative feed between an appropriate rotary tool and a workpiece during the operation is in the direction of the rotary axis of the tool.

It is frequently necessary for a plurality of separate drilling operations to be performed on one workpiece. In such circumstances the normal procedure is to use a plurality of separte drilling machines either operated in turn by one operator or single or in groups by a number of operators, or a single machine fitted with a multi-spindle drilling head. Thus generally either a plurality of drilling machines is necessary or an expensive drilling head has to be produced to suit the workpiece and which, in any case, will only enable simultaneous drilling of a plurality of holes in one and the same face of the workpiece. Either of these arrangements, though expensive, is normally cheaper and quicker than using one machine whose operator has to fit a fresh drill between each drilling operation.

It is an object of the present invention to provide a drilling machine which may readily be used by one operator to perform a number of separate drilling operations successively on one workpiece, and without fitting a fresh drill between each operation.

A further object of the invention is to provide a drilling machine including a turret drilling head incorporating a plurality of drill spindles which may be selectively and individually indexed into an operative position above a drilling table, manually controlled feeding mechanism for producing relative movement of the drilling head and table, and driving mechanism in the head by which all the spindles can be driven simultaneously. Preferably the spindles are driven continuously even during indexing movement of the head.

A still further object is to provide a drilling machine having a turret drilling head incorporating a plurality of drill spindles, means for indexing the head about a fixed rotary axis to bring any one of the spindles individually into an operative position, driving means for rotating each spindle when in the operative position, a drilling table which may be fed towards the head, and separately adjustable stop means associated with each spindle to limit the feeding movement of the table towards the corresponding spindle when the latter is in the operative position.

The drill spindles may be disposed radially of the turret in which case, when the machine is installed with the drilling axis vertical, the fixed axis of the turret will be horizontal.

The adjustable stop means may comprise adjustable stop members mounted on the turret, equal in number to the number of spindles, and disposed to cooperate with a fixed abutment movable with the drilling table.

A driving mechanism for the spindles may include constant mesh gearing within the head so that all the spindles are driven simultaneously. Power may be fed to this gearing via a drive shaft whose rotary axis is coincident with the indexing axis of the turret.

By means of the invention an inexpensive and versatile bench mounting drilling machine may be provided by the use of which considerable time-saving may be effected in a variety of multiple drilling operations.

One advantage of a drilling machine according to the invention is that it enables a single jig to be used for a plurality of different drilling operations, thus saving the cost of producing a plurality of jigs such as are commonly used in association with a plurality of separate drilling machines.

The use of a single jig is facilitated if the drilling bushes thereof are colour coded, the same colour code being applied to the drill spindles of the turret in which are mounted corresponding drills. The colour coding of the turret may take the form of interchangeable coloured discs which are mounted on the turret in positions corresponding to the drill spindles and cooperate with an aperture in a shield fixed in front of the turret so that the disc visible through the aperture is the one corresponding to the spindle in the operative position. This shield may be extended to shroud the spindles not in the operative position to provide a guard therefor. The coloured discs may be coloured transparencies adapted for mounting in illuminated windows in the front of the turret.

It is desirable that a range of speeds be provided for the drill spindles so that the drill in use may be driven at a speed appropriate to the operation which it is performing. If only simple drilling operations are concerned a motor drive for the machine incorporating a belt driven stepped pulley may provide sufficient speed variation. In some circumstances, such as when tapping operations have to be performed, a very wide range of speed variation will be required and in such cases it is envisaged that the machine may be provided with some form of infinitely variable speed drive.

The invention will now be further described with reference to the accompanying drawings which illustrate, by way of example, a bench mounting drilling machine according to the invention, and in which:

FIGURE 1 is a front view of the machine with a guard thereof partially cut away to show hidden detail, FIGURE 2 is a cross-sectional view mainly on the line II—II, but partly on the line II—II', in FIGURE 1, and FIGURE 3 is a cross-sectional view on the line III—III in FIGURE 2.

The machine has a cast base 1 for bench mounting on which is supported a horizontal rectangular drilling table 2 and an upright framework comprising four spaced pillars 3 bolted to the base 1. A casing of the machine comprises a front plate 4 and side plates 5 bolted to the pillars 3, and a shell-like upper casing portion 6 bolted to the tops of the pillars by bolts such as 7. The portion 6 overhangs the table 2 at the front of the framework and is formed integrally with two spaced bearing blocks 8 and 9 which provide cylindrical bearing journals having a common horizontal axis disposed fore-and-aft of the machine.

A turret drilling head disposed centrally above the table 2 is formed from a front portion 10 and a rear portion 11 and incorporates six drill spindles such as 12 rotatably mounted in bearings such as 13. The rear portion 11 has a rearwardly extending bearing sleeve 14 which is axially located and journalled in the two bearing blocks 8 and 9. Axial location of the sleeve 14 is provided in one direction by a shoulder on the portion 11 and in the opposite direction by an annular disc 15 bolted to the rear end of the sleeve.

The six drill spindles 12 are equiangularly disposed radially of the sleeve 14 in a vertical plane normal to the sleeve axis. The outer end of each spindle 12 is provided with a male taper, which may for example serve for attachment of a chuck 16 as shown in chain-dotted lines in FIGURE 2.

An indexing plate 17 disposed vertically across the machine is fixed by bolts such as 18 to the front of the casing portion 6 and has six bushed indexing bores such as 19 located on a pitch circle centred about the axis of the bearing sleeve 14. In order to show the indexing arrangement the turret head 10, 11 and the indexing plate 17 are shown in FIGURE 2 sectioned along the line II—II' in FIGURE 1, the remainder of FIGURE 2 being sectioned along the line II—II. Mounted on the turret head 10, 11 is a spring loaded detent bolt member 20 urged by a compression spring 21 towards the indexing plate 17 and aligned with said pitch circle for selective engagement in the indexing bores 19. A detent operating knob 22 is disposed at the front of the machine and is fixed to a shaft 23 slidably mounted in an axial bore 24 in the turret portion 10. A plate 25 welded to the shaft 23 limits axial movement of the latter in one direction, and such axial movement is limited in the opposite direction by a circlip 26 adjacent the rear end of the shaft 23. The bolt member 20 passes through the plate 25 and has an enlarged head 27 which engages the front surface of the plate 25.

The knob 22 can be grasped and pulled forwardly by an operator of the machine to disengage the bolt member 20 from the indexing plate 17, whereupon the knob 22 can be turned to rotate the turret head to another indexed position when the knob 22 is released to re-engage the bolt member 20 in a fresh bore 19 of the plate 17. Both the bolt member 20 and the indexing bores 19 are so arranged that when the former is engaged in one of the latter, a corresponding one of the drill spindles 12 will be vertically disposed immediately above the drilling table 2.

The drilling table 2 is attached to a vertical guide stem 28 which is of triangular cross-section and mounted in a triangular guide-way 29 of a guide block 30 bolted to the base 1. Guide plates 31 bolted to the guide block 30 provide for complete vertical guiding of the stem 28, and hence the table 22, during its vertical movement towards and away from the drilling head 10, 11.

A mechanism for feeding the table 2 towards and away from the head 10, 11 includes a manually operated feed lever 32 pivotally mounted on a pivot pin 33 below the upper surface of the base 1 and projecting through a slot in the side of the latter. At its inner end the lever 32 is attached to a feed chain 34 which passes over two pulleys 35 and is attached at its other end to the upper side of a rearwardly directed lug 36 formed on the stem 28. The pulleys 35 are pivotally mounted on a bracket 37 bolted to the base 1, and as can be seen from the drawings forward movement of the upwardly cranked projecting outer end 32a of the lever 32 is transmitted through the chain 34 to produce an upward feeding movement of the table 2. Downward movement of the table 2 takes place under the influence of gravity.

The handle 32 projects from the right-hand side of the base 1 below an outwardly directed flange 38 of the latter. This flange 38 is provided with a spaced series of bores 39 into which a captive pin 40 can be selectively placed, this pin then projecting below the flange 38 to limit movement of the handle 32 and hence feeding movement of the table 2.

A gear drive shaft 41 passes through and is located coaxially with the bearing sleeve 14. Towards its forward end the shaft 41 is mounted in a bearing 42 within the turret and towards its rearward end in a bearing 43 located in the sleeve 14. Constant mesh gearing within the turret head 10, 11 comprises a bevel gearwheel 44 fixed at the forward end of the shaft 41 and meshing with pinions such as 45 fixed to the inner ends of the drill spindles 12. At its rearward end the drive shaft 41 carries a stepped driven pulley 46, and an electric motor 47 the drive shaft of which carries an aligned oppositely stepped pulley 48 is mounted on the base 11 within the casing. In use a V-belt which is not illustrated couples the pulleys 46 and 48 and enables the drive ratio thereof to be altered.

Six spindles such as 49 are threaded into the bearing sleeve 14 immediately behind the forward bearing block 8. These spindles extend radially from the sleeve 14 in a vertical plane disposed laterally of the machine, and each is aligned axially of the sleeve 14 with one of the drill spindles 12 and has a threaded outer end portion 49a. On this portion 49a is mounted a stop member in the form of a nut 50 which may be locked in an adjusted position on the portion 49a by means of a locknut 51. A fixed vertical stop 52 is mounted on the drilling table 2, and is so disposed that for each indexed position of the turret head 10, 11 a corresponding one of the spindles 49 will lie in the path of the fixed stop 52 during upward feeding movement of the drilling table 2. During such movement the corresponding threaded portion 49a is received in a longitudinal bore 53 of the stop 52, and upward feeding movement of the table 2 is limited by abutment of the corresponding stop nut 50 and the upper end of the stop 52.

In view of the fact that all the drill spindles 12 are rotating during operation of the machine, a front guard 54 is fitted which shrouds the five spindles not in the operative position to prevent inadvertent contact between them and the machine operator. This guard has an aperture through which the shaft 23 projects and another aperture 55a through which the front face of one of six brackets 55 is visible in each indexed position of the turret head 10, 11. The six brackets 55 are fixed to the front of the turret portion 10 and carry numerals on their front faces which identify the particular drilling spindle which is in the operative position.

A rear guard 56 is fitted which shrouds the belt drive for the drive shaft 41, and this guard is held in position by knobs 57 which may be unscrewed to allow the guard 56 to be removed to adjust the V-belt and change the drive ratio.

I claim:

1. A drilling machine comprising a drilling table, a turret head mounted above said table and incorporating a plurality of drill spindles arranged radially of an indexing axis about which said head can be indexed to bring a selected one of said spindles to an operative position relatively to said table, bearing means in which said head is mounted for indexing movement, said bearing means having an effective axial length greater than the overhang of said spindles from said bearing means, driving means including a drive shaft coaxial with said bearing means for rotating said spindles, manually actuable feeding mechanism for producing relative feeding movement of said table and said head and separately adjustable stop means to limit said feeding movement according to the indexed position of said head, such stop means comprising adjustable stop members mounted on said head and individually associated with said spindles and an abutment fixed relatively to said table.

2. A drilling machine according to claim 1, wherein said indexing axis is fixed and said feeding mechanism acts to feed said table, said fixed abutment being mounted for movement with said table towards the adjustable stop member associated with the spindle in said operative position.

3. A drilling machine comprising a drilling table, a turret drilling head arranged above said table and incorporating a plurality of drill spindles, bearing means for said head allowing the latter to be turned to index said spindles selectively and individually into an operative position above said table, the effective axial length spanned by said bearing means being greater than the overhang of said spindles from said bearing means, means for holding said head in indexed position, manually actuable feeding mechanism for producing relative feeding movement of said head and table, and driving means for said spindles incorporating a drive shaft passing coaxially through said bearing means.

4. A drilling machine according to claim 3, wherein said axis is fixed and said feeding mechanism acts to feed said table upwardly towards said head.

5. A drilling machine according to claim 3, wherein said means for holding said head in position include detent means for locking said head in an indexed position and a knob mounted on said head for axial movement to operate said detent means, turning of said knob producing indexing movement of said head when the detent means are freed.

6. A drilling machine comprising a drilling table, a turret drilling head arranged above said table and incorporating a plurality of drill spindles, bearing means for said head enabling the latter to be turned to index said spindles selectively and individually into an operative position above said table, said bearing means comprising a plurality of spaced bearings together spanning a greater effective axial length than the overhang of said spindles from said bearing means, means for holding said head in indexed position, manually actuable feeding mechanism for producing relative feeding movement of said head and table, driving mechanism in said head permanently in driving engagement with each of said spindles whereby all the latter can be driven simultaneously even during indexing movement of said head, and a drive shaft for said mechanism arranged coaxially with said bearing means.

7. A drilling machine comprising a drilling table, a turret drilling head incorporating a plurality of drill spindles and arranged for indexing movement above said table about a substantially horizontal axis, a rearwardly extending bearing sleeve supporting said head and rotatable therewith, bearing means in which said sleeve is supported and freely rotatable, said bearing means spanning an effective axial length greater than the overhang of the spindles in front of said bearing means, means for holding said head in indexed position with one of said drill spindles in an operative position above said table, driving mechanism in said head for driving said spindles, and a drive shaft for said mechanism passing coaxially through said bearing sleeve.

8. A drilling machine according to claim 7, wherein said bearing means comprise spaced bearing journals which together span said effective axial bearing length.

9. A drilling machine according to claim 7, wherein said drive shaft is rotatably mounted in spaced bearings within said bearing sleeve.

10. A drilling machine comprising a drilling table, a turret drilling head incorporating a plurality of drill spindles and arranged for indexing movement above said table about a substantially horizontal axis, a rearwardly extending bearing sleeve supporting said head and rotatable therewith, a pluraltiy of spaced bearings in which said sleeve is supported and freely rotatable and which together span an effective axial length greater than the overhang of the spindles from the front one of said bearings, means for holding said head in indexed position with one of said spindles in an operative position above said table, manually actuable feeding mechanism for feeding said table upwardly towards said head, driving mechanism in said head for driving said spindles, and a drive shaft for said mechanism passing coaxially through said bearings.

11. A drilling machine according to claim 10, wherein a plurality of adjustable stop members individually associated with said spindles are mounted on said sleeve behind said front bearing, and a fixed abutment is mounted on said table for cooperation with the stop member associated with the spindle which is indexed in its operative position.

12. A drilling machine comprising a drilling table, a turret drilling head arranged above said table and incorporating a plurality of radially projecting drill spindles, bearing means in which said head is freely rotatable to allow indexing movement of the latter to index said spindles selectively and individually into an operative position above said table, the effective axial length spanned by said bearing means being several times greater than the overhang of said spindles from said bearing means, constant mesh gearing within said head permanently in driving engagement with each of said spindles, and a drive shaft permanently coupled to said gearing passing coaxially through said bearing means.

References Cited in the file of this patent

UNITED STATES PATENTS

| | | |
|---|---|---|
| 983,395 | Ogle | Feb. 7, 1911 |
| 2,670,636 | Burg | Mar. 2, 1954 |
| 2,682,698 | Berthiez | July 6, 1954 |
| 2,701,017 | Wiedemann | Feb. 1, 1955 |

FOREIGN PATENTS

| | | |
|---|---|---|
| 508,350 | Germany | Sept. 29, 1930 |